United States Patent [19]

Foster et al.

[11] Patent Number: 4,897,867
[45] Date of Patent: Jan. 30, 1990

[54] METHOD OF AND AN ARRANGEMENT FOR FORWARDING A CUSTOMER ORDER

[75] Inventors: Robert W. Foster, Glen Ellyn; Charles B. Hirschman; Marie L. Todd, both of Naperville, all of Ill.

[73] Assignee: American Telephone and Telegraph Company, AT&T Bell Laboratories, Murray Hill, N.J.

[21] Appl. No.: 170,561

[22] Filed: Mar. 15, 1988

Related U.S. Application Data

[63] Continuation of Ser. No. 781,895, Sep. 30, 1985, abandoned.

[51] Int. Cl.⁴ .................. H04M 11/08; H04M 15/00
[52] U.S. Cl. .................................. 379/94; 379/105; 379/246; 358/86; 455/4
[58] Field of Search .................. 358/84–86; 455/2, 4, 5; 379/91–94, 101, 102, 104, 105, 127, 142, 201, 246

[56] References Cited

U.S. PATENT DOCUMENTS

| | | |
|---|---|---|
| 3,484,560 | 12/1969 | Jaeger, Jr. et al. |
| 3,920,908 | 11/1975 | Kraus ................................. 379/91 |
| 4,165,446 | 8/1979 | Flowers et al. .................... 379/94 |
| 4,166,929 | 9/1979 | Sheinbein . |
| 4,191,860 | 3/1980 | Weber . |
| 4,277,649 | 7/1981 | Sheinbein ....................... 379/246 X |
| 4,357,493 | 11/1982 | Anderson et al. . |
| 4,506,111 | 3/1985 | Takenouchi et al. . |
| 4,518,989 | 5/1985 | Yabiki et al. ......................... 358/86 |
| 4,530,008 | 7/1985 | McVoy ............................ 358/86 X |
| 4,555,594 | 11/1985 | Friedes et al. .................... 379/247 X |
| 4,570,008 | 3/1971 | Downing et al. ................... 364/200 |
| 4,590,516 | 5/1986 | Abraham ............................. 358/86 |
| 4,611,096 | 9/1986 | Asmuth et al. . |
| 4,742,513 | 5/1988 | Reichard, Jr. et al. ............ 358/86 X |
| 4,755,872 | 7/1988 | Bestler et al. ........................ 358/86 |
| 4,763,191 | 8/1988 | Gordon et al. ...................... 358/86 |
| 4,797,913 | 1/1989 | Kaplan et al. ....................... 379/91 |
| 4,807,023 | 2/1989 | Bestler et al. ....................... 358/86 |
| 4,852,154 | 7/1989 | Lewis et al. ...................... 379/105 |

FOREIGN PATENT DOCUMENTS

WO85/03830 8/1985 PCT Int'l Appl. .................. 358/85
87/04884 8/1987 PCT Int'l Appl. .................. 379/94

OTHER PUBLICATIONS

Zenith Electronics, "Advanced New Cable TV Technology for Impulse-Pay-Per-View," Press Release issued in Las Vegas, Nev., Jun. 3, 1985 by Zenith Electronics of Glenview, Ill., copy obtained from Dialog Data Base 'File 621'.

A. F. Bulfer, "Dial-A-View", Talk Given Dec. 3, 1984 at the Motion Picture Industry Seminar in Los Angeles, Calif.

(List continued on next page.)

Primary Examiner—Keith E. George
Attorney, Agent, or Firm—Peter Visserman

[57] ABSTRACT

A method and an arrangement are disclosed for forwarding a customer order received from a requesting customer line to a vendor data link. For use with a telecommunications switching system, the order entry arrangement includes a customer signal receiver for receiving customer signals from a requesting customer line and a processor for sending the orders received from the receiver to the vendor data link. The processor normally controls the operation of the switching network of the switching system but also sends received customer orders and the identity of the requesting line to a vendor data link in response to a customer entered order entry request code. Optional vendor identification information may be entered by the customer for selecting a desired vendor. Customer identification information may also be entered by the customer for billing and order security purposes. After the order is received, the order entry arrangement returns an order confirmation signal to the requesting line.

28 Claims, 5 Drawing Sheets

OTHER PUBLICATIONS

Science Dynamics, Corp., Advertisement, "Profit from Impulse Pay-Per-View", *Telephony*, Jul. 14, 1986, p. 59.

A. F. Bulfer et al., "A Trial of a National Pay-Per-View Ordering and Billing System", *Cable '86*, 1986 NCTA Technical Papers.

M. Berger, K. Gibbons, "New Customer-Defined Network Service", *Telephony*, Mar. 10, 1986, pp. 50, 52, 54, 58, 60.

R. J. Frank, R. J. Keevers, F. B. Strebendt, and J. E. Waninski, "No. 4 ESS TM : Mass Announcement Capability", *Bell System Technical Journal*, vol. 60, No. 6, Jul.-Aug. 1981, p. 1078.

*AT&T Network Communications Applications and Services*, "Dial-It ® 900 Service", Issue 4, Dec. 1986, Section 4.5.1-4.5.5, pp. 1-10.

J. Magara et al., "Advanced Video Response System—Phase III—", 2254 Japan Telecommunications Review, vol. 23, No. 3, Tokyo, Japan, Jul. 1981, pp. 243-249.

S. Sirazi et al., "Comparative Study of Hybrid-IPPV Implementations", Cable '85: Sessions in Detail, Las Vegas, Nev., Jul. 3, 1985, pp. 1-7.

*Cable and the Telcos: from Confrontation to Detente*, Report 83-1, The Yankee Group, Boston, Mass., Jun., 1983, pp. 162-167.

FIG. 2

TEMPORARY CALL REGISTER LAYOUT

| GENERAL CALL PROCESSING DATA |
|---|
| DIALED DIGITS: CALLED LINE DIRECTORY NUMBER/ORDER ENTRY CODE |
| CUSTOMER LINE EQUIPMENT NUMBER |
| CUSTOMER LINE DIRECTORY NUMBER |

(Lower three rows: SPECIFIC CALL PROCESSING DATA)

FIG. 3

ORDER ENTRY TABLE

| PDC | PR | EP | TOD | CA | CHAN | CD | ODC |
|---|---|---|---|---|---|---|---|

LEGEND:
- CA — CONFIRMATION ANNOUNCEMENT BIT: IF SET, RETURN ANNOUNCEMENT, OTHERWISE RETURN TONE.
- CD — CHECK DIGIT BIT: IF SET, INDICATES CHECK DIGIT IS INCLUDED.
- CHAN — CHANNEL NUMBER FIELD: INDICATES THE IDENTITY OF THE DESIGNATED VENDOR DATA LINK USED TO SEND THE ORDER INFORMATION TO THE DESIRED VENDOR.
- EP — EXPECT PIN (PERSONAL IDENTIFICATION NUMBER) BIT: A PIN MAY BE INCLUDED IN THE INPUT INFORMATION.
- ODC — ORDER DIGIT COUNT INDICATES THE NUMBER OF DIGITS TO EXPECT FOR THE ORDER (MIN = 1, MAX = 12).
- PDC — PIN DIGIT COUNT INDICATES THE NUMBER OF DIGITS TO EXPECT FOR A PIN (MIN = 0, MAX = 12).
- PR — PIN REQUIRED BIT: IF SET, A PIN MUST ALWAYS BE RECEIVED FROM THE INPUT INFORMATION.
- TOD — TIME-OF-DAY BIT INDICATES TIME OF DAY IS INCLUDED IN THE OUTPUT MESSAGE SENT TO THE VENDOR.

METHOD OF AND AN ARRANGEMENT FOR FORWARDING A CUSTOMER ORDER

This application is a continuation of application Ser. No. 781,895, filed Sept. 30, 1985 now abandoned.

TECHNICAL FIELD

This invention relates generally to telecommunications systems and particularly to a method of and an arrangement for forwarding to a vendor data link a customer order received from a requesting customer line.

BACKGROUND OF THE INVENTION

Most cable television vendors provide subscribing customers a predetermined number of viewing channels for a basic monthly fee. Such vendors typically also offer customers the opportunity to subscribe to and receive one or more premium channels of movie, sports, and entertainment selections for an additional monthly fee. This additional monthly fee is commonly based on the number of premium channels subscribed to by the customer. Many times the same program selections are transmitted on different premium channels, but at different times of the day. Thus, by subscribing to a greater number of premium channels, the customer has greater viewing time flexibility.

Cable TV vendors utilizing addressable converter/decoders at the customer's television also offer customers special program selections on a pay per view basis. These special program selections commonly involve a recent movie release or a live concert or sporting event for which the customer pays an extra individual charge to receive each selection. A customer desiring to receive a special program selection telephones the cable TV vendor to order the desired selection. The vendor takes the order, charges the customer a fee for the selection, and addresses the customer's converter/decoder to enable the customer to receive the selection at a designated viewing time. Vendors can manually take customer telephone orders or utilize an automatic pay per view (PPV) order taking arrangement.

In one prior art automatic PPV order taking arrangement, disclosed in *Cable and Telcos: From Confrontation to Derente*, Report No. 83-1, The Yankee Group, Boston, Mass., June, 1983, pages 163-167, a "black box" is connected to an automatic number identification (ANI) type trunk at a telecommunications switching system office to receive the order from the customer and the identity of the requesting customer line from the office ANI system. The "black box" sends the customer order and the identification of the requesting customer line to the vendor's data processing equipment over a dedicated data channel.

It is anticipated that 75% of the PPV order requests are received in the last half hour before a scheduled event starts. Manual order taking is too slow and would be very expensive, if not impossible, to receive and process a large number of order requests in this peak demand period. The automatic "black box" is much faster than the manual order-taking, but has several drawbacks. First, the telephone company or vendor must purchase and maintain a sufficient number of complicated "black boxes" along with one or more dedicated data channels to handle peak demands. Second, the cable vendor must pay for the plurality of long-distance ANI type trunks connected to the "black boxes".

SUMMARY OF THE INVENTION

The foregoing problems are solved and a technical advance is achieved by a novel order entry arrangement illustratively integrated into a central processor of a telephone switching system and advantageously without the use of multiple individual "black boxes" and plural ANI type trunks in a telephone switching system office. The arrangement includes a receiver, such as a customer signal receiver of the telephone office, for receiving customer signals including a customer order from a requesting customer line. The processor of the arrangement is equipped to collect customer order data from the receiver and to derive the identity of the requesting customer line. The processor thereafter formulates the order and requesting line identity for transmission over a vendor data link to enable the vendor to act on the customer order.

In the illustrative embodiment of the invention, a central processor of a program-controlled switching system controls the establishment of call connections through the system switching network and, advantageously, in response to a customer entered order entry request code, utilizes an input/output processor to send to a designated vendor data link a customer order dialed or keyed into the system. The order is received by the switching system with a customer signal receiver which commonly serves both dial pulse and dual-tone multifrequency signaling. In response to the order entry code from the receiver, the central processor abandons normal call processing, and collects order information including the desired vendor, and derives requesting customer line identification. The central processor then activates the input/output processor for sending the collected order information and the identity of the requesting customer line over a data link to the desired vendor's processing equipment. A call store memory of the telephone system maintains line translations information for the identity of customers served by the switching system. A call store memory order entry table maintains the identity of the data link to a desired vendor that is accessed with the order entry code and any customer entered vendor code. This order entry table information is required to identify the data link to a desired vendor particularly when a number of different vendors provide the same type of service. After the customer order is received from the requesting customer line, an announcement system illustratively returns an order confirmation signal to the requesting customer line.

Without any action on the part of the customer, the identity of the requesting customer line is forwarded over the vendor data link along with the customer order to identify the requesting customer line to the vendor processing equipment. Optional customer identification may also be entered when required by the vendor for billing and order security purposes, but is not required for the operation of the order entry arrangement.

When different vendors provide the same type of service, a customer identifies a desired vendor by entering a vendor code in conjunction with the order entry request code or the order information. The processor performs a table look-up translation with the vendor code to identify a designated vendor data link to the desired vendor processing equipment.

The method of forwarding a customer order includes collecting at the processor the customer order received from a requesting customer line by a customer signal receiver. The processor then derives the identity of the requesting line and sends that identity and the received customer order over a designated data link to the desired vendor processing equipment.

A feature of the invention is the checking of the customer order for customer entered errors by the use of a check-sum algorithm.

Another feature is that the method for forwarding customer orders may be implemented in a switching system without the use of "black boxes" connected to additional ANI type trunks.

BRIEF DESCRIPTION OF THE DRAWING

The invention is more fully understood from the following detailed description when read with reference to the drawing in which:

FIG. 2 depicts the layout of an illustrative temporary call register for the arrangement of FIG. 1;

FIG. 3 depicts the layout of an illustrative order entry table for the arrangement of FIG. 1.

DETAILED DESCRIPTION

Figure 1:
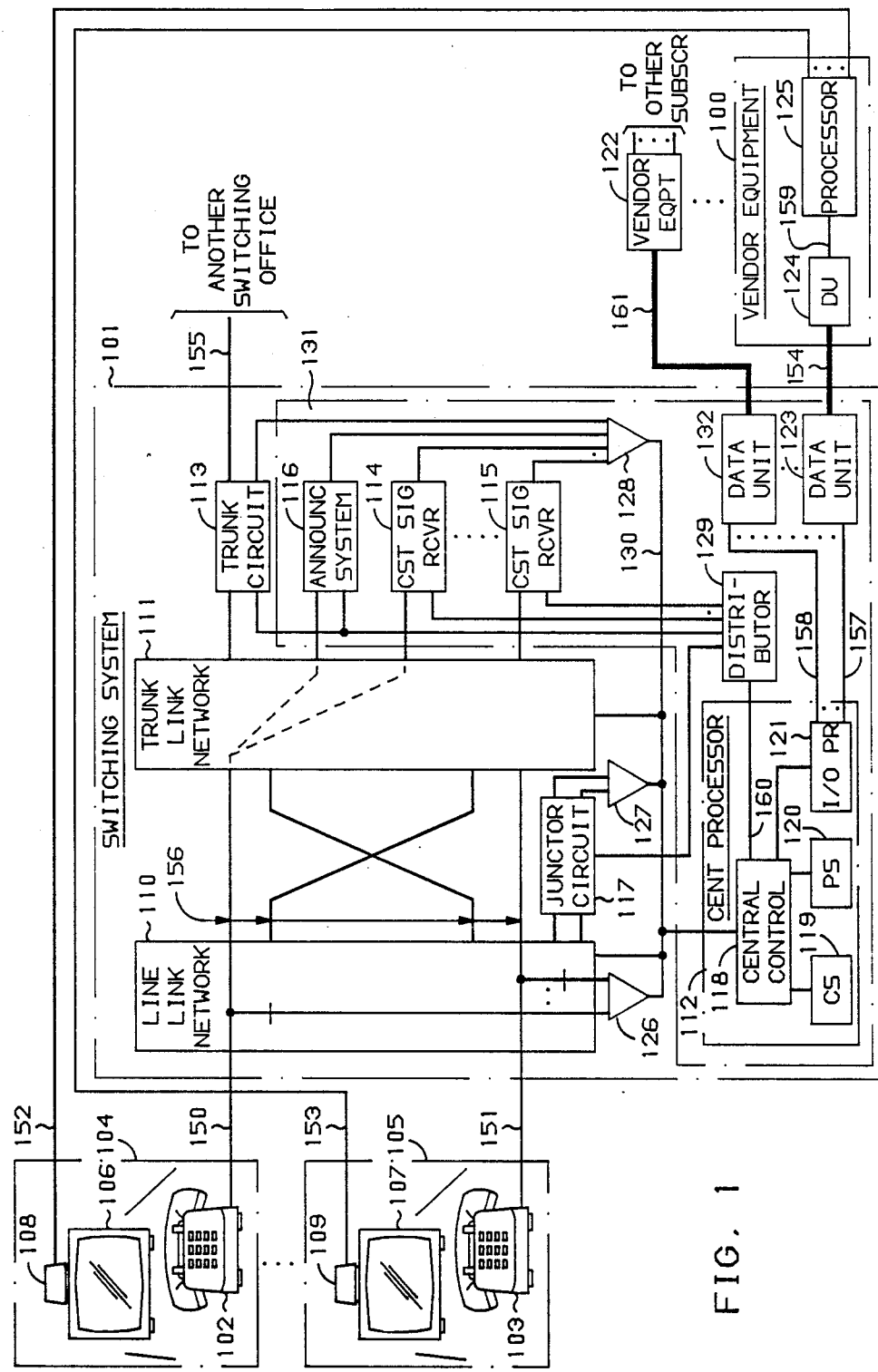
FIG. 1 depicts the illustrative order entry arrangement.

FIG. 1 depicts an illustrative embodiment of an order entry arrangement 131 for forwarding to a vendor data link a customer entered order received from a requesting telecommunications line. The order entry arrangement is integrated into a switching system 101 that serves a plurality of customer telecommunication lines, such as 150 and 151. The order entry arrangement includes a central processor 112 which advantageously controls a switching network comprising line and trunk link networks 110 and 111. The processor also controls the sending of customer entered orders from requesting customer lines via the network and customer signal receivers 114, 115 through processor 112 over respective data communications channels 157, 158; data units 123, 132; and data links 154, 161 to vendor equipment 100, 122. The central processor also derives the identity of the requesting line from stored translations information and sends the derived line identity along with the customer order to the desired vendor equipment. Customer lines 150 and 151 are connected to respective telephones 102 and 103 at customer premises 104 and 105, respectively. In this illustrative embodiment, vendor equipment 100 transmits customer ordered cable television program selections to customer televisions 106 and 107 via well-known coaxial TV cables 152 and 153 and addressable converters 108 and 109, respectively.

A customer places an order for a desired program selection with a cable TV vendor by entering at his or her telephone an order entry request code and the order to the order entry arrangement. After collecting the order from the requesting customer line, the order entry arrangement returns an announcement signal to the requesting line to confirm the receipt of the order. The order entry arrangement then sends the order and the identity of the requesting line, such as the directory number of the requesting line, to cable TV vendor equipment 100 via dedicated data link 154. Additional customer entered identification that may be required by the vendor for billing and order security purposes is also sent to the vendor equipment along with the order and the identity of the requesting line. In response, the cable TV vendor equipment transmits the ordered program selection to the requesting customer's television at a designated time and charges the identified customer for the ordered program selection.

Switching system 101 is suitably an electronic program-controlled switching system of the type disclosed in U.S. Pat. No. 3,570,008 to R. W. Downing et al. of Mar. 9, 1971, and also disclosed in *The Bell System Technical Journal*, Volume 43, No. 5, Parts 1 and 2, Sept., 1964. An updated central processor suitable for use in this switching system and order entry arrangement is described in *The Bell System Technical Journal*, Vol. 56, No. 2, Feb., 1977. These cited references may be consulted for a more comprehensive understanding of the construction and operation of an electronic program-controlled switching system.

Switching system 101 includes line link network 110 and trunk link network 111 under the control of stored program-controlled central processor 112. Line link network 110 provides terminations for customer telephones, such as 102 and 103 via respective communication lines 150 and 151, while trunk link network 111 provides terminations for interoffice trunks, such as 155 via trunk circuit 113. The trunk link network also provides terminations for other well-known service circuits. For example, these service circuits include a plurality of customer signal receivers, such as 114 and 115, for receiving customer entered signals and announcement system 116 for announcing to requesting lines the receipt of customer entered order signals. The line and trunk link networks are connected via wire junctors 156 to permit the interconnection of lines, trunks, and service circuits for establishing communications including call paths and connections through the networks under the control of central processor 112. Junctor circuits, such as 117, complete call paths and connections through line link network 110 and supervise intraoffice calls between telephones.

The majority of the logic, control, storage, supervisory, and translation functions required for the operation of the switching system are performed by central processor 112. In particular, the central processor controls the operation of the networks to establish paths and connections between lines, trunks, and service circuits in a well-known manner. As part of the order entry arrangement, the central processor collects customer entered order signals from the receivers in response to a customer entered order entry request signal and sends to a designated vendor data link the customer order and the identity of the requesting line derived from stored translations information. The central processor includes central control 118, call store 119, program store 120, and input/output processor 121. Call store 119 is a memory for storing well-known translation and routing information in addition to temporary information relating to calls in progress and special services such as collecting and sending customer entered orders received from a requesting customer line. The translation information includes line identification information, such as well-known directory and equipment numbers for each line. Temporary information includes the busy/idle status of circuits and customer lines and the directory numbers of calling and called lines as well as calling lines requesting to place customer entered orders with a customer designated vendor. The call store memory also includes a number of well-known temporary call registers.

FIG. 2 depicts the layout of an illustrative temporary call register which is used by the central control to temporarily store call processing and order entry information on a per call or individual order entry basis. This information includes well-known general call processing data as well as specific data for the order entry arrangement. The specific data includes customer entered signals such as an order entry request code and order information. The order data includes program selection data, optional vendor identification to forward the order to a designated vendor data link, and requesting customer identification that may be required by a vendor for billing and order security purposes. In addition, the specific data in the temporary call register includes the directory and equipment numbers of the requesting customer line. Under the control of program instructions in program store 120, central control 118 derives the requesting line directory number from the translations information in a well-known manner using the equipment number associated with the requesting line.

The translation information stored in call store 119 also includes an order entry table that identifies, amongst other things, the designated data link and output channel to desired vendor equipment. The central processor accesses this order entry table with the received order entry request code and any customer entered vendor code using a well-known table look-up operation. In addition, the order entry table includes such information as the number of customer entered digits that may be received for a valid order entry. FIG. 3 depicts the fields and layout of an illustrative order entry table. The use of the order entry table and the fields contained therein will be further described hereinafter.

Program store 120 is a memory for storing program instructions that direct central control 118 to sequentially perform its many call processing and order entry functions. With respect to call processing, the stored program instructions direct the central control to control the operation of the switching network. The switching network establishes communications including call paths and connections through the line and trunk link networks to a called customer line when customer entered signals include the directory number of the called line. With respect to the order entry arrangement, the stored program instructions direct the central control to collect and send a customer entered order to a designated vendor data link without establishing a call path through the networks to a called line when the customer entered signals include an order entry request code.

Central control 118 is the information processing unit of the switching system and the order entry arrangement that executes the program instructions stored in program store 120 using the translations and temporary information stored in call store 119.

Input/output processor 121 buffers and sends the customer entered orders received from central control 118 to designated vendor equipment via one or more of a plurality of data communication channels, such as 157 and 158 to respective vendor equipment 100 and 122. In particular, data channel 157 carries data such as the customer entered order to switching system data unit 123 that terminates one end of data link 154 to vendor equipment 100. Data unit 123 modulates and sends the customer entered order to vendor data unit 124 at vendor equipment 100 which in turn demodulates and sends the order to vendor processor 125 via data communications channel 159.

Central processor 112 interfaces and communicates with lines, trunks, and service circuits via scanners 126-128 and distributor 129. Distributor 129 responds to a control signal over bus system 160 from the central control to apply pulses to distribution points connected to the various service circuits. For example, in response to an appropriate control signal, distributor 129 signals announcement system 116 to send an order confirmation announcement to the requesting line.

Scanners 126-128 gather information for the central control by monitoring leads connected to the various service circuits and customer lines. Scanner 128 forwards customer entered signals received by customer signal receivers 114 and 115 to central control 118 over bus 130. Scanners 126 and 127 recognize requests for service from the customer lines by monitoring the "off-hook/on-hook" condition of the lines.

Order entry arrangement 131 includes central processor 112 and a plurality of customer signal receivers such as 114 and 115. In response to a customer entered order entry request, central control 118 under the control of program instructions stored in program store 120 sends the customer entered order received from a customer signal receiver over a designated vendor data link to the desired vendor equipment. The central control also uses the temporary call register in call store 119 for customer entered information and storing the identity of the requesting line derived from call store translations information. In addition, the central control uses the order entry table also stored in call store 119 to process the order.

Figure 4:
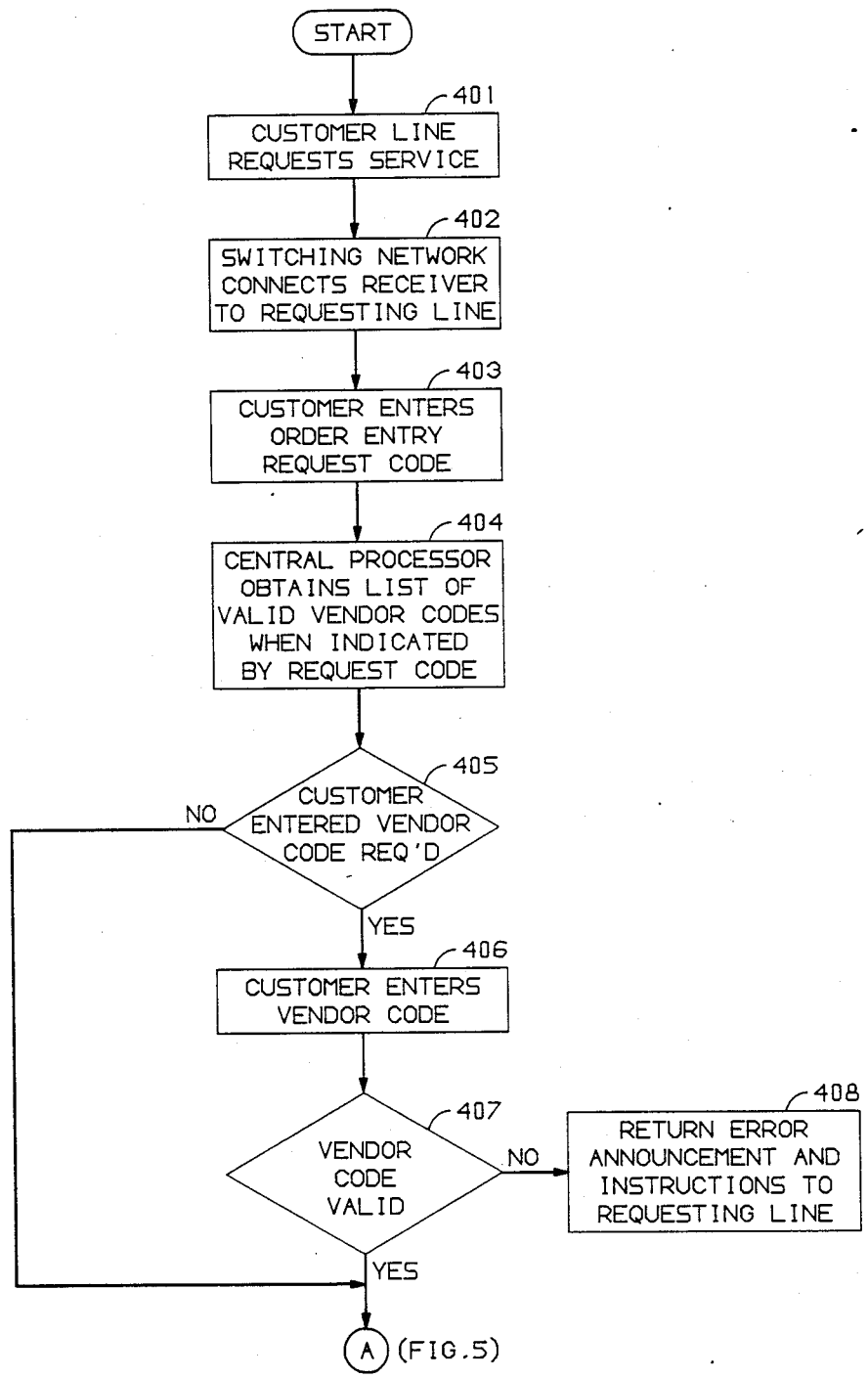
FIG. 4-6 depict an illustrative flow diagram for the arrangement of FIG. 1.
Figure 5:
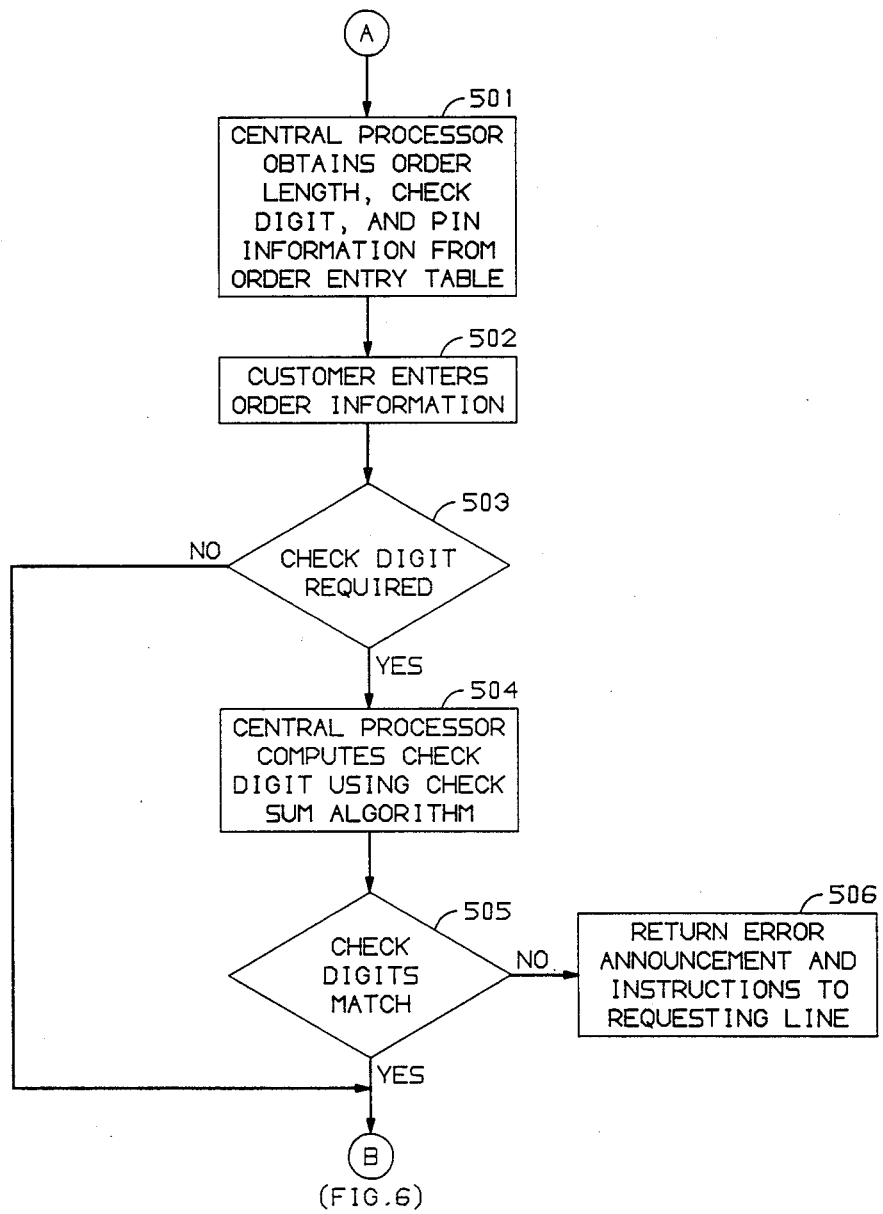
Figure 6:
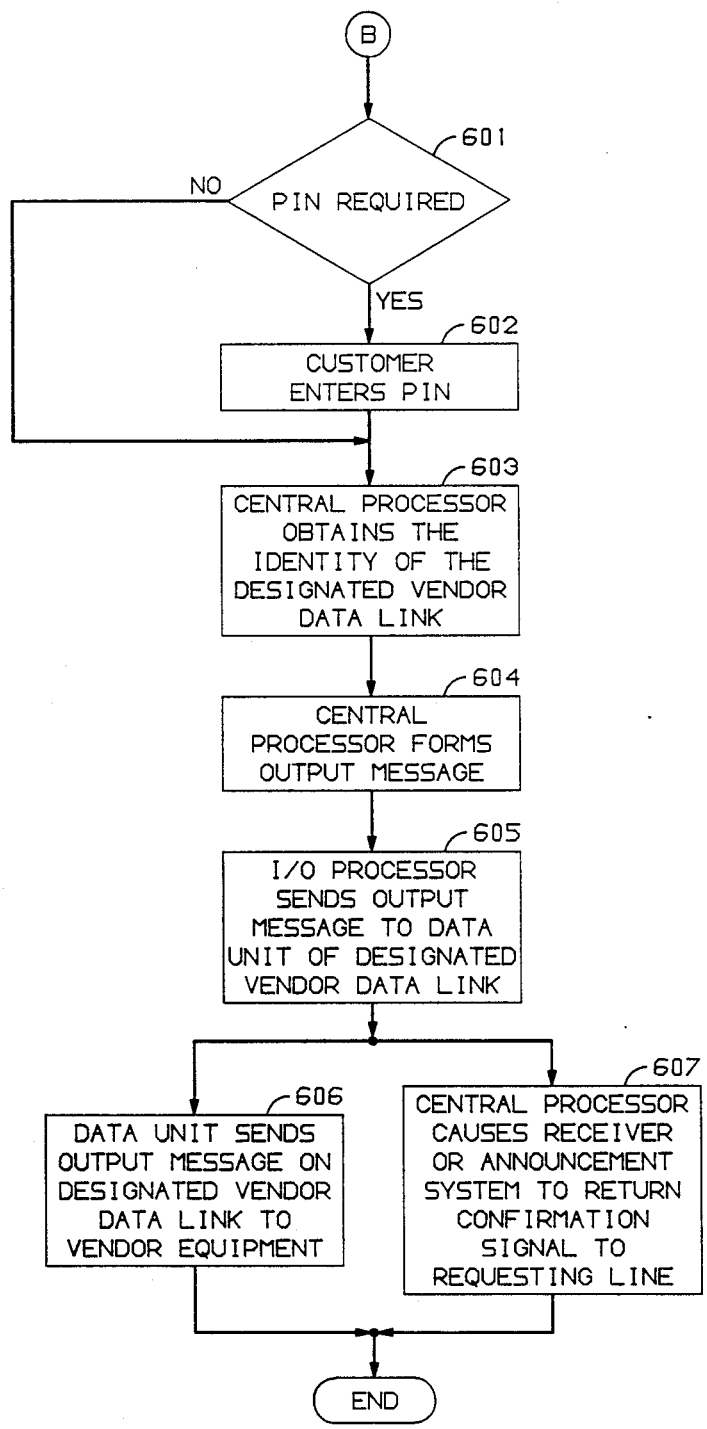

Depicted in FIGS. 4-6 is a flow diagram illustrating one implementation of the method of forwarding to a vendor data link a customer entered order received from a requesting customer line. This flow diagram depicts actions performed by a customer and steps performed by the order entry arrangement under the control of program instructions stored in program store 120. For purposes of illustration, it is assumed that a customer at telephone 102 desires to place an order with cable television vendor equipment 100 to receive a desired program selection at television 106 via cable 152 and addressable converter 108. To request service, the customer lifts the handset of telephone 102, which together with customer line 150 assumes a well-known "off-hook" supervisory state (block 401). Central processor 112 via scanner 126 detects the "off-hook" supervisory state of customer line 150 as a request for service. In a well-known manner, central control 118 enters the line equipment number and the derived directory number of the requesting line in a temporary call register of call store 119. Central control 118 derives the directory number of the requesting line from the translations information stored in call store 119 with the use of the line equipment number of the requesting line. Under the control of central processor 112, line link network 110 and trunk link network 111 connect customer signal receiver 114 to requesting customer line 150 (block 402).

Connected to requesting customer line 150, customer signal receiver 114 returns dial tone to the customer at telephone 102 in a well-known manner. To initiate the order entry process, the customer at telephone 102 enters an order entry request code such as "*85" (block 403). Customer signal receiver 114 receives and sends the order entry request code to central processor 112 which collects the order entry request code in the temporary call register associated with the requesting line. Central processor 112 recognizes the "*85" order entry request code as a special service request and halts normal call processing. The request code indicates to the processor to send a customer entered order and the identity of the requesting line to a designated data link which carries the order and requesting line identification to the processing equipment of the desired cable TV vendor. Furthermore, additional or the same order entry codes with different vendor codes may be used to designate different order entry services such as ordering from a restaurant menu or perhaps ordering merchandise from a local retail department store. The order entry request code also alerts the central processor that a sequence of order entry digits is expected and not a sequence of digits associated with the directory number of a called customer line.

When the order entry arrangement forwards orders to several vendors providing the same type of service, the requesting customer must enter a vendor code to identify the desired vendor. This is initially indicated by the order entry request code. When indicated, central control 118 accesses translations information in call store 119 to obtain a list of valid vendor codes (block 404). When a vendor code is required ("yes" leg of decision block 405), the customer enters a vendor code which identifies the desired vendor (block 406). Upon receipt of the customer entered vendor code, processor 112 checks its validity (block 407) and returns an error announcement and further instructions to the requesting line when the entered code is invalid (block 408). When only one vendor provides a particular type of service ("no" leg of decision block 405), the requesting customer is not required to enter a vendor code.

As indicated in block 501 of FIG. 5, the central processor next obtains order length, check digit (CD), and personal identification number (PIN) information for the identified vendor from the order entry information table in call store 119 (block 501). As previously mentioned, an illustrative order entry table is depicted in FIG. 3. The order length information includes the order digit count (ODC) that indicates the number of expected digits to be received for the customer entered order. The check digit (CD) field indicates whether check sum digit information is to be included in the entered order information. The PIN information includes expected PIN (EP), PIN required (PR), and PIN digit count (PDC) information. The optional personal identification number provides supplemental information for billing and order security.

The customer then enters the order information to request the desired TV program selection (block 502). When the order information is to include a check digit (block 503), the processor computes a check digit from the entered digits using a well-known check sum algorithm to detect dialing errors such as incorrectly entered digits (block 504). The check digit included in the entered order information is provided to the customer by the vendor. The computed check digit is then compared with the entered check digit for a match (block 505). When the computed and entered check digits do not match, the requesting customer receives an error announcement and instructions to reenter the order information (block 506).

When the computed and entered check digit match ("yes" leg of decision block 505) or a check digit is not required ("no" leg of decision block 503), the central processor determines from the order entry table whether the vendor requires the customer to enter a personal identification number (block 601 of FIG. 6). When required ("yes" leg of decision block 601), the customer then enters his or her personal identification number for providing the vendor with supplemental billing and order security information (block 602). After the personal identification number is received or when a personal identification number is not required ("no" leg of decision block 601), the processor obtains from the order entry table the I/0 processor channel number (CHAN) to the designated vendor data link (block 603). The central processor then forms an output message to the desired vendor equipment which includes the order information, the directory number of the requesting line, and any personal identification number (block 604). Central control 118 then sends the output message to input/output processor 121. The input/output processor buffers and sends the output message to the data unit of the designated vendor data link (block 605). The data unit sends the output message over designated vendor data link 154 to desired vendor equipment 100 (block 606). As an added feature, when the time-of-day (TOD) bit in the order entry table is set, the time of day can also be included in the output message to the vendor equipment. The path to the designated vendor equipment from the central processor is independent of the switching equipment and customer signal receiver, thus reducing congestion through the switching network.

Upon receiving the entered order information from the order entry system, vendor processor 125 addresses customer converter/decoder 108 via coaxial TV cable 152 to allow customer television 106 to receive the desired program selection at the designated time.

After the central processor transmits the output message to input/output processor 121, the central processor causes the customer signal receiver to return a confirmation tone to the requesting customer (block 607). Alternatively, the central processor can cause trunk link network 111 to connect announcement system 116 to the requesting line for providing a confirmation announcement when the confirmation announcement (CA) bit in the order entry table is set. After the confirmation tone or announcement is returned to the requesting line, the customer signal receiver and announcement system are disconnected from the requesting line.

Thus, the order entry arrangement receives and sends the customer entered order along with the directory number of the requesting line and any customer entered personal identification number to the designated vendor data link without establishing a call path through the network to a called line. Establishing call paths through the network again only serves to congest the network for normally processed calls.

It is to be understood that the above-described method of and arrangement for forwarding to a vendor data link a customer entered order received from a requesting line is merely an illustrative embodiment of the principles of this invention and that numerous other methods and arrangements may be devised by those skilled in the art without departing from the spirit and scope of this invention. In particular, this order entry arrangement may be utilized to serve any number of vendors for placing any kind of order. This can be implemented using various combinations of different order entry request and vendor codes that specify a particular type of service or product or one of a number of different vendors supplying the same service or product.

What is claimed is:

1. For use in a telephone switching system having a switching network for serving a plurality of customer lines and also having processor means for controlling establishment of connections through said network, an order entry arrangement for forwarding to a vendor data link a customer order received from a requesting one of said lines, said order indicating a desired selection, comprising:

receiver means for receiving customer signals including said customer order from said requesting line, and wherein said processor means is responsive to said customer order received by said receiver means for sending said customer order to said vendor data link for the provision of said desired selection in response thereto without establishing a connection through said network to said vendor data link.

2. The invention of claim 1 wherein each of said lines has an identity, wherein said processor means includes means for driving the identity of said requesting line, and wherein said processor means is for sending the derived identify of said requesting line and said customer order to said vendor data link.

3. For use in a telephone switching system having a switching network for serving a plurality of customer lines and also having processor means for controlling establishment of connections through said network, an order entry arrangement for forwarding to a vendor data link a customer order received from a requesting one of said lines, said order indicating a desired selection, comprising:

receiver means for receiving customer signals including said customer order from said requesting line, and wherein said processor means is responsive to said customer order received by said receiver means for sending said customer order to said vendor data link for the provision of said desired selection in response thereto without establishing a connection through said network to said vendor data link and wherein said processor means includes means responsive to a predetermined algorithm for detecting an incorrectly entered customer order received from said requesting line.

4. The invention of claim 1 further comprising means for returning to said requesting line a configuration signal indicating the receipt of said customer order.

5. The invention of claim 1 wherein said processor means includes means for sending said customer order to a designated one of a plurality of vendor data links.

6. For use in a telephone switching system having a switching network serving a plurality of lines, an order entry arrangement for forwarding to a data link a customer order entered on a requesting one of said lines, said order indicating a desired section, comprising:

processor means of said switching system for controlling said network to establish a connection for a signal from said requesting line to said processor means; and wherein said processor means includes means responsive to a customer order signal including said customer order received from said requesting line via said network for sending said customer order from said processor means to said data link for the provision of said desired selection in response thereto without establishing a connection through said network to said data link.

7. The invention of claim 6 wherein each of said lines has an identity, wherein said processor means further includes means for deriving the identity of said requesting line, and wherein said processor means is for sending the derived identity of said requesting line and said customer order to said data link.

8. For use in a telephone switching system having a switching network serving a plurality of customer lines, an order entry arrangement for forwarding to a vendor data link a customer order received from a requesting one of said lines, said order indicating a desired selection, comprising:

receiver means for receiving customer signals including said customer order from said requesting line via said network;

processor means of said switching system for controlling said network to interconnect said requesting line and said receiver means; and wherein said processor means includes means responsive to said customer order received from said receiver means for sending said customer order from said processor means to said vendor data link for the provision of said desired selection in response thereto without establishing a connection through said network to said vendor data link.

9. The invention of claim 8 wherein each of said lines has an identity, wherein said processor means further includes means for deriving the identity of said requesting line, and wherein said processor means is for sending the derived identity of said requesting line and said customer order to said vendor data link.

10. The invention of claim 8 wherein said processor means further includes means for sending said customer order to said vendor data link over a path independent of said network and said receiver.

11. For use with a telephone switching system having a processor for controlling a switching network serving a plurality of lines and also having a customer signal receiver for serving said lines, a method of forwarding to a vendor data link a customer order received from a requesting one of said lines, said order indicating a desired selection, comprising the steps of:

collecting at said processor said customer order received from said requesting line via said network and said receiver in response to a customer order entry request received from said requesting line via said network and said receiver, deriving at said processor the identity of said requesting line, and sending said customer order and the identity of said requesting line from said processor to said vendor data link for the provision of said desired selection in response thereto without establishing a connection through said network to said vendor data link.

12. For use with a telephone switching system having a processor for controlling a switching network serving a plurality of lines and also having a customer signal receiver for serving said lines, a method of forwarding to a vendor data link a customer order received from a requesting one of said lines, said order indicating a desired selection, comprising the steps of:

collecting at said processor said customer order received from said requesting line via said network and said receiver in response to a customer order entry request received from said requesting line via said network and said receiver, deriving at said processor the identity of said requesting line, checking with a predetermined algorithm said customer order for entry errors, and sending said customer order and the identity of said requesting line from said processor to said vendor data link for the provision of said desire selection in response thereto without establishing a connection through said network to said vendor data link, only if no entry errors are detected.

13. The method of claim 11 further comprising the step of designating one of a plurality of vendor data links for carrying said customer order and the derived identity of said requesting line in response to a vendor code received from said requesting line via said network and said receiver indicating said designated vendor data link.

14. The method of claim 11 further comprising the step of sending a confirmation signal to said requesting line indicating the receipt of said customer order.

15. A switching system comprising:

switching means serving a plurality of lines and operable for establishing a call connection for a requesting one of said lines, processor means responsive to a call on said requesting line for controlling the operation of said switching means, and an order entry arrangement comprising, a vendor data link, and said processor means including means responsive to said call for deriving a number identification for said requesting line, and means responsive to the receipt of customer order entry request and order signals indicative of a desired selection received via said requesting line and said call connection during said cell for sending customer order information including said derived number identification from said processor means to said vendor data link for the provision of said desired selection in response thereto without establishing a connection through said switching means to said vendor data link.

16. The invention of claim 15 wherein said number identification comprises a directory number and said deriving means comprises means for storing said directory number and means responsive to said call on said line for retrieving said directory number from said storing means.

17. The invention of claim 16 wherein said customer order information comprises order data signified by said customer order signals and said directory number and said sending means sends said customer order data and said retrieved directory number directly from said processor means to said data link.

18. The invention of claim 17 further comprising receiver means connected to said switching means via said call connection to said line in response to said call for receiving said customer order entry request and order signals and means for communicating said request and order signals to said sending means and wherein said sending means sends said order data and said retrieved directory number from said processor means to said data link over a path independent of said receiver means.

19. The invention of claim 16 further comprising receiver means connected to said switching means via said call connection to said line in response to said call for receiving said customer order entry request and order signals and means for communicating said request and order signals to said sending means and wherein said sending means sends said order data and said retrieved directory number from said processor means to said data link over a path independent of said receiver means.

20. The invention of claim 15 further comprising receiver means connected to said switching means via said call connection to said line in response to said call for receiving said customer order entry request and order signals and said customer order information comprises said directory number and order data signified by said customer order data and said sending means sends said customer order signals and said retrieved directory number directly from said processor means to said data link over a path independent of said receiver means.

21. An order entry arrangement for use in a telephone switching system having a switching network and processor means for controlling said network, receiver means for receiving customer order entry and order signals, and data link, means for communicating customer order data entry signified by said order signals; the invention comprising:

said processor means including means responsive to said request and order signals received by said receiver means for deriving a customer identification number, and said processor means including means responsive to said derived customer identification number for sending said derived number plus said customer order data to said data link means without establishing a connection through said network to said data link means.

22. For use in a telephone switching system having a switching network for serving a plurality of customer lines and also having processor means for controlling establishment of connections through said network, an order entry arrangement for forwarding to a vendor data link a customer order received from a requesting one of said lines, said order indicating a desired selection, comprising receiver means for receiving customer signals including said customer order from said requesting line, and wherein said processor means is responsive to said customer order received by said receiver means for sending said customer order to said vendor data link for the provision of said desired selection in response thereto without establishing a completed call connection through said network interconnecting said requesting line and said vendor data link.

23. For use in a telephone switching system having a network for establishing connections, an order entry arrangement for sending to a data link an order indicating a desired selection and received from a requesting one of a plurality of lines, comprising:

processor means of said switching system responsive to a call from said requesting line for controlling establishment of a completed call connection through said network for connecting said requesting line and another of said lines, and wherein said processor means includes means responsive to said order received from said requesting line via said network for sending said order from said processor means to said data link for the provision of said desired selection in response thereto without establishing a completed call connection through said network interconnecting said requesting line and said data link.

24. For use in a telephone switching system having a switching network serving a plurality of customer lines, an order entry arrangement for forwarding to a vendor data link a customer order received from a requesting one of said lines, said order indicating a desired selection, comprising:
receiver means for receiving customer signals including said customer order from said requesting line via said network;
processor means of said switching system for controlling said network to interconnect said requesting line and said receiver means; and
wherein said processor means includes means responsive to said customer order received from said receiver means for sending said customer order from said processor means to said vendor data link for the provision of said desired selection in response thereto without establishing a completed call connection through said network interconnecting said requesting line and said vendor data link.

25. For use with a telephone switching system having a processor for controlling a switching network serving a plurality of lines and also having a customer signal receiver for serving said lines, a method of forwarding to a data link an order received from a requesting one of said lines, said order indicating a desired selection, comprising the steps of:
collecting at said processor said order received from said requesting line via said network and said receiver in response to an order entry request received from said requesting line via said network and said receiver,
deriving at said processor the identity of said requesting line, and
sending said order and the identity of said requesting line from said processor to said data link for the provision of said desired selection in response thereto without establishing a completed cell connection through said network interconnecting said requesting line and said vendor data link.

26. An order entry arrangement for use in a telephone switching system having a switching network and processor means for controlling said network, receiver means for receiving customer order entry request and order signals, and data link means for communicating customer order data signified by said order signal;
the invention comprising:
said processor means including means responsive to said request and order signals received by said receiver means for deriving a customer identification number, and
said processor means including means responsive to said derived customer identification number for sending said derived number plus said customer order data to said data link means without establishing a completed call connection through said network to said data link means.

27. For use in a telephone switching system having a network for establishing connections and also having processor means for controlling establishment of completed call connections through said network for selectively interconnecting a plurality of customer lines, an order entry arrangement for sending to a data link an order indicating a desired selection and received from a requesting one of said lines, comprising:
receiver means for receiving signals including said order from said requesting line, and
wherein said processor means is responsive to said order received by said receiver means for sending information indicative of said desired selection to said data link for provision of said desired selection in response thereto without establishing a completed call connection through said network interconnecting said requesting line and said data link.

28. A telephone system comprising:
switching means for establishing connections and
processor means responsive to a call from a requesting one of a plurality of lines for controlling said switching means for establishing a completed call connection for interconnecting said requesting line and another one of said lines, wherein said processor means is responsive to an order for a desired selection from said requesting line, for sending information indicative of said desired selection from said processor means to a data link for provision of said desired selection in response thereto without establishing a completed call connection through said switching means interconnecting said requesting line and said data link.

* * * * *

UNITED STATES PATENT AND TRADEMARK OFFICE
CERTIFICATE OF CORRECTION

PATENT NO. : 4,897,867

DATED : January 30, 1990

INVENTOR(S) : R. W. Foster, C. B. Hirschman, M. L. Todd

It is certified that error appears in the above-identified patent and that said Letters Patent is hereby corrected as shown below:

Column 9, line 21, "driving" should be --deriving--.

Column 9, line 24, "identify" should be --identity--.

Column 9, line 47, "configuration" should be --confirmation--.

Column 9, line 56, "section" should be --selection--.

Column 11, line 34, "cell" should be -- call--.

Column 12, line 22, "entry" should be --entry request--.

Signed and Sealed this

Fourth Day of May, 1993

Attest:

MICHAEL K. KIRK

Attesting Officer

Acting Commissioner of Patents and Trademarks